(12) United States Patent
Kojima et al.

(10) Patent No.: US 7,536,727 B2
(45) Date of Patent: May 19, 2009

(54) CONTENT MANAGEMENT METHOD, RECORDING AND/OR REPRODUCING APPARATUS, AND RECORDING MEDIUM

(75) Inventors: Tadashi Kojima, Yokohama (JP); Hisashi Yamada, Yokohama (JP); Taku Kato, Fuchu (JP); Atsushi Ishihara, Yokohama (JP); Kazuhiko Taira, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 786 days.

(21) Appl. No.: 10/722,487

(22) Filed: Nov. 28, 2003

(65) Prior Publication Data

US 2004/0172549 A1    Sep. 2, 2004

(30) Foreign Application Priority Data

Nov. 29, 2002    (JP) .............................. 2002-348925

(51) Int. Cl.
*H04L 9/00* (2006.01)

(52) U.S. Cl. .......................................... 726/31; 726/33

(58) Field of Classification Search ................. 726/26; 380/284; 705/57
See application file for complete search history.

(56) References Cited

U.S. PATENT DOCUMENTS

| | | | | |
|---|---|---|---|---|
| 5,923,754 | A * | 7/1999 | Angelo et al. ................ | 705/54 |
| 6,134,660 | A * | 10/2000 | Boneh et al. ................. | 713/193 |
| 6,832,319 | B1 * | 12/2004 | Bell et al. ..................... | 713/193 |
| 7,073,073 | B1 * | 7/2006 | Nonaka et al. ............... | 713/193 |
| 7,158,641 | B2 * | 1/2007 | Hori et al. .................... | 380/277 |
| 7,178,037 | B2 * | 2/2007 | Shimada et al. .............. | 713/193 |
| 2003/0061500 | A1 * | 3/2003 | Mimura et al. ............... | 713/193 |
| 2003/0190043 | A1 * | 10/2003 | Sigbjornsen et al. ......... | 380/201 |
| 2004/0030909 | A1 * | 2/2004 | Sako et al. ................... | 713/193 |
| 2004/0218214 | A1 * | 11/2004 | Kihara et al. ................. | 358/1.16 |
| 2005/0005148 | A1 * | 1/2005 | Ishibashi et al. ............. | 713/193 |

(Continued)

FOREIGN PATENT DOCUMENTS

EP    0 886 409    12/1998

(Continued)

OTHER PUBLICATIONS

O. Scheikl, et al., Preceedings of the International Conference on Parallel Processing Workshops (ICPPW'02), XP-010608426, pp. 17-24, "Multi-Level Secure Multicast: The Rethinking of Secure Locks", Aug. 18, 2002.

(Continued)

*Primary Examiner*—Nasser G Moazzami
*Assistant Examiner*—Daniel L Hoang
(74) *Attorney, Agent, or Firm*—Oblon, Spivak, McClelland, Maier & Neustadt, P.C.

(57) ABSTRACT

In a content management method, content data is encrypted by a first key, the first key is encrypted by plural types of second keys, the encrypted first key is multiply encrypted by a third key, and the third key is encrypted by a fourth key. These encrypted content data, a medium key which is the first key encrypted by the second key and a move key which is a first key multiply encoded by the second and third keys are recorded in a recording medium, the third key encrypted by the fourth key is recorded in a security region. This management method is managed by the move key and the medium key.

1 Claim, 14 Drawing Sheets

U.S. PATENT DOCUMENTS

2005/0120232 A1* 6/2005 Hori et al. .................. 713/193
2007/0030974 A1* 2/2007 Ishibashi et al. ............ 380/281

FOREIGN PATENT DOCUMENTS

| JP | 9-136709 | 5/1997 |
| JP | 2000-98885 | 4/2000 |
| JP | 2000-330870 | 11/2000 |
| JP | 2001-22859 | 1/2001 |
| JP | 2001-76348 | 3/2001 |
| JP | 2001-351323 | 12/2001 |
| JP | 2002-229859 | 8/2002 |
| KR | 2002-0025229 | 4/2002 |
| WO | WO 00/58962 | 10/2000 |

OTHER PUBLICATIONS

Intel Coporation, XP-002226155, the whole DVD book, "CPRM Specification: DVD Book, Revision 0.95", May 31, 2001.

* cited by examiner

MB-Key table

Move-Key table

| File identification of encrypted encryption key (MB-Key) | | Number of CONT encrypted encryption keys |
|---|---|---|
| Cont-1 Enc-TK | Cont-1 record number | ◯ |
| Cont-2 Enc-TK | Cont-2 record number | ◯ |
| Cont-3 Enc-TK | Cont-3 record number | × |
| ... | ... | |
| Cont-(n-1) Enc-TK | Cont-(n-1) record number | ◯ |
| Cont-n Enc-TK | Cont-n record number | ◯ |
| RSB | RSB | |
| RSB | RSB | |

| File identification of encrypted encryption key (Move-Key) | | Number of cont encrypted encryption keys |
|---|---|---|
| Cont-1 Enc2-TK | Cont-1 record number | ◯ |
| Cont-2 Enc2-TK | Cont-2 record number | ◯ |
| | Cont-3 record number | ◯ |
| ... | ... | |
| Cont-(n-1) Enc2-TK | Cont-(n-1) record number | ◯ |
| Cont-n Enc2-TK | Cont-n record number | ◯ |
| RSB | RSB | |
| RSB | RSB | |

(a) Information on presence or absence of Enc-2TK (b) Information on presence or absence of Enc-TK (One table is allocated to ECC block, and each of the tables is written in quadruple in each of 4 ECC blocks.)

FIG. 15

CONTENT MANAGEMENT METHOD, RECORDING AND/OR REPRODUCING APPARATUS, AND RECORDING MEDIUM

CROSS-REFERENCE TO RELATED APPLICATIONS

This application is based upon and claims the benefit of priority from the prior Japanese Patent Application No. 2002-348925, filed Nov. 29, 2002, the entire contents of which are incorporated herein by reference.

BACKGROUND OF THE INVENTION

1. Field of the Invention

The present invention relates to a content management method for managing content data and a recording and/or reproducing apparatus using the management method; and a recording medium having content data or the like recorded therein by the apparatus. More particularly, the present invention relates to a content management method, a recording and/or reproducing apparatus which enable predetermined movement of content data while preventing unlimited illegal copy; and a recording medium for the method and apparatus.

2. Description of the Related Art

Conventionally, as a medium for recording digitized information (such as a document, a voice, an image, or a program, for example), a compact disk or a laser disk is used for a medium for recording a voice or an image. In addition, a floppy disk or a hard disk is used for a medium for recording a program or data in a computer or the like. In addition to these recording mediums, a DVD (Digital Versatile Disk) which is a large capacity recording medium is developed.

In a variety of such digital recording mediums, digital data (including compressed or encoded data which can be decoded) is recorded intact during recording. Thus, recorded data can be copied from one medium to another medium easily and without losing a sound loss or an image quality, for example. Therefore, in these digital recording mediums, there is a problem that a large amount of copies can be produced, causing infringement of copyrights.

Concurrently, as a content encryption and/or decryption method of the conventional technique, a copyright protection system called CSS (Content Scramble System) is introduced for a DVD-video disk used exclusively for reproduction in order to prevent illegal copy of contents.

In the above described conventional apparatus, however, movement of contents are carried out while illegal copy is prevented and copyrights are protected, and at the same time, reproduction of contents cannot be carried out by a conventional reproducing apparatus which is a general-purpose machine. That is, there is a problem that there cannot be ensured user's convenience that, while movement of content data is carried out properly, reproduction by the conventional apparatus is carried out.

BRIEF SUMMARY OF THE INVENTION

According to one embodiment of the present invention, there is provided a content management method, comprising: encrypting content data by a first key (TK); encrypting the first key by predetermined plural types of second keys (MUK); multiply encrypting the encrypted first key (Enc-TK) by a third key (MM); encrypting the third key by a predetermined fourth key (MMK); recording in a recording medium content data (Enc-Contents) encrypted by the first key, the first key (Enc-TK) encrypted by the predetermined plural types of second keys, and the first key (Enc2-TK) obtained by multiply encrypting the encrypted first key (Enc-TK) by the third key (MM), and recording the third key (Enc-MM) encrypted by the fourth key in a security region of the recording medium.

BRIEF DESCRIPTION OF THE SEVERAL VIEWS OF THE DRAWING

FIG. 15 is a view showing an example of a table for a move key (Move-Key: Enc2-TK) and a medium key (MB-Key: Enc-TK) in a recording medium in the content management method according to an embodiment of the present invention.

DETAILED DESCRIPTION OF THE INVENTION

Figure 1:
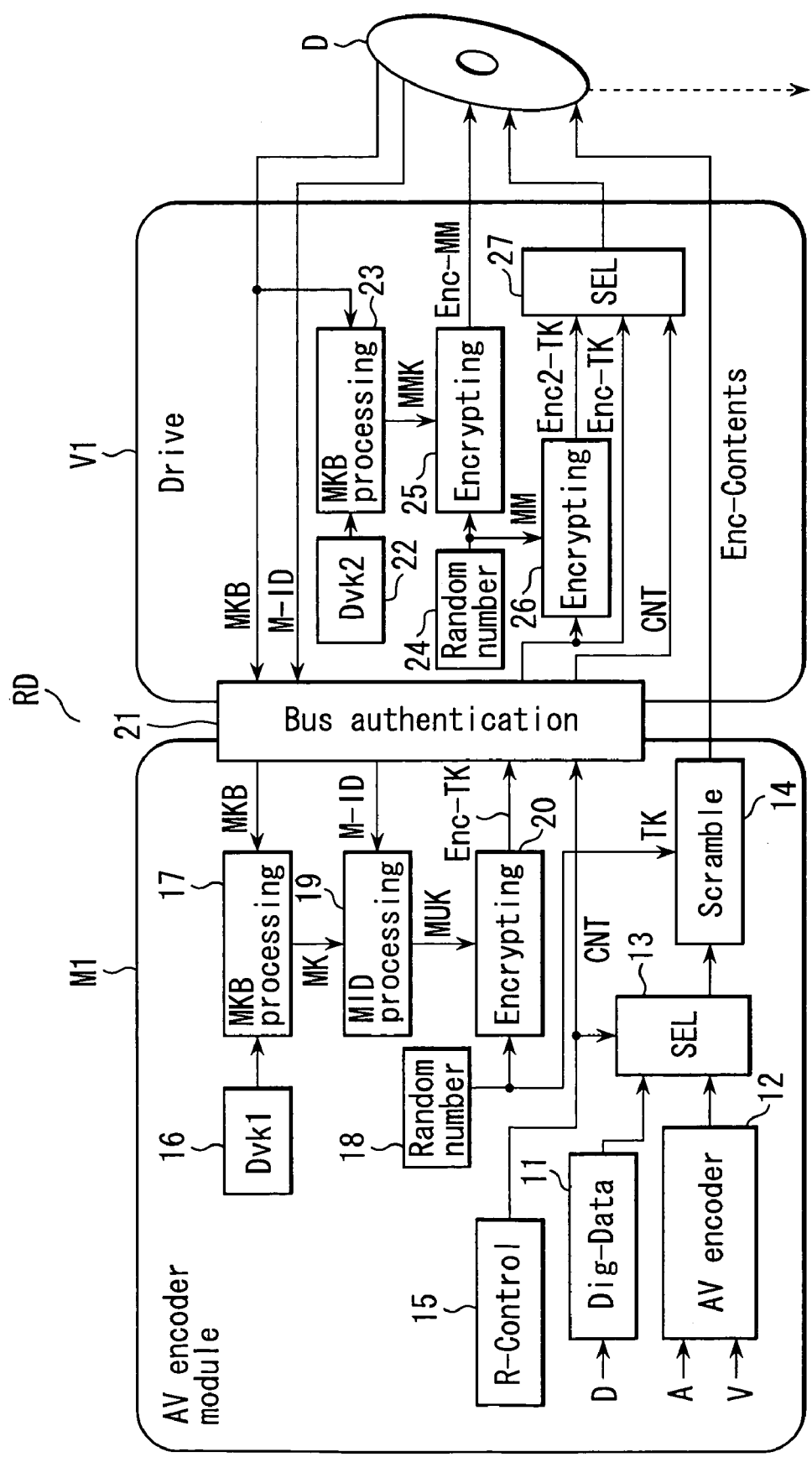
FIG. 1 is a block diagram depicting an example of encryption by a content management method according to an embodiment of the present invention.
Figure 2:
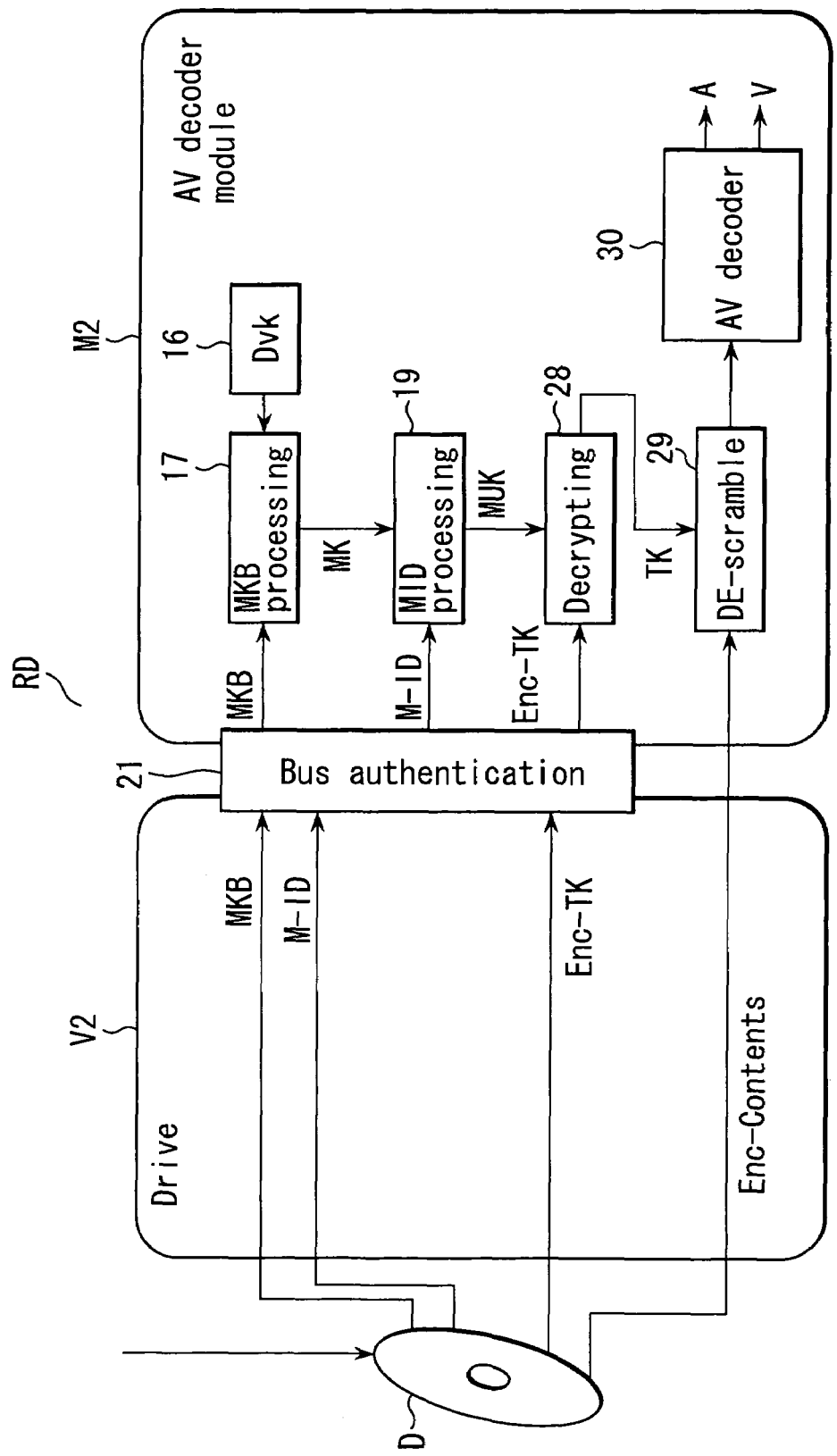
FIG. 2 is a block diagram depicting an example of decryption by a general method for contents encrypted by the content management method according to an embodiment of the present invention.
Figure 3:
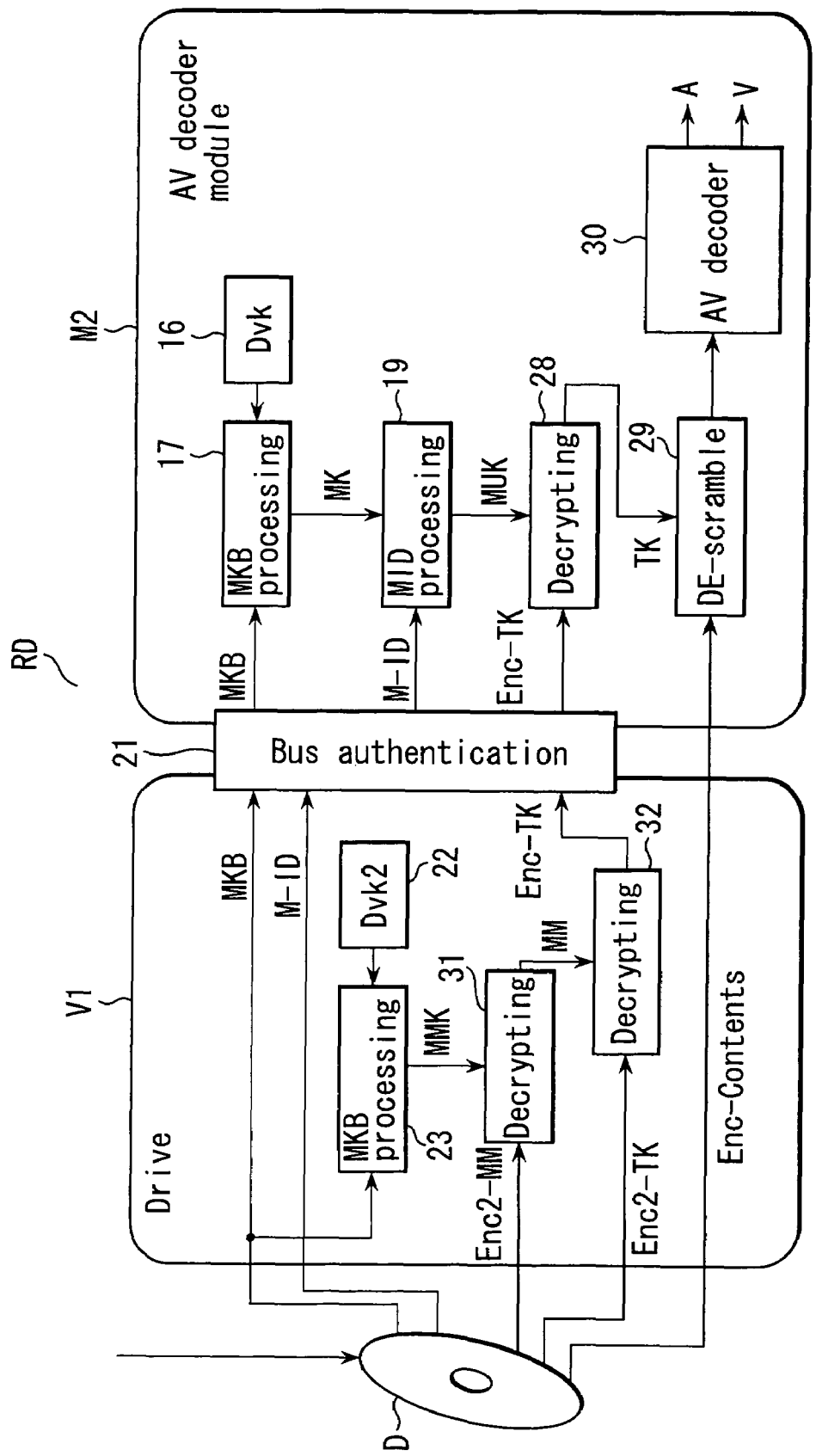
FIG. 3 is a block diagram depicting an example of decryption by a method according to an embodiment of the present invention for the contents encrypted by the content management method according to an embodiment of the present invention.
Figure 4:
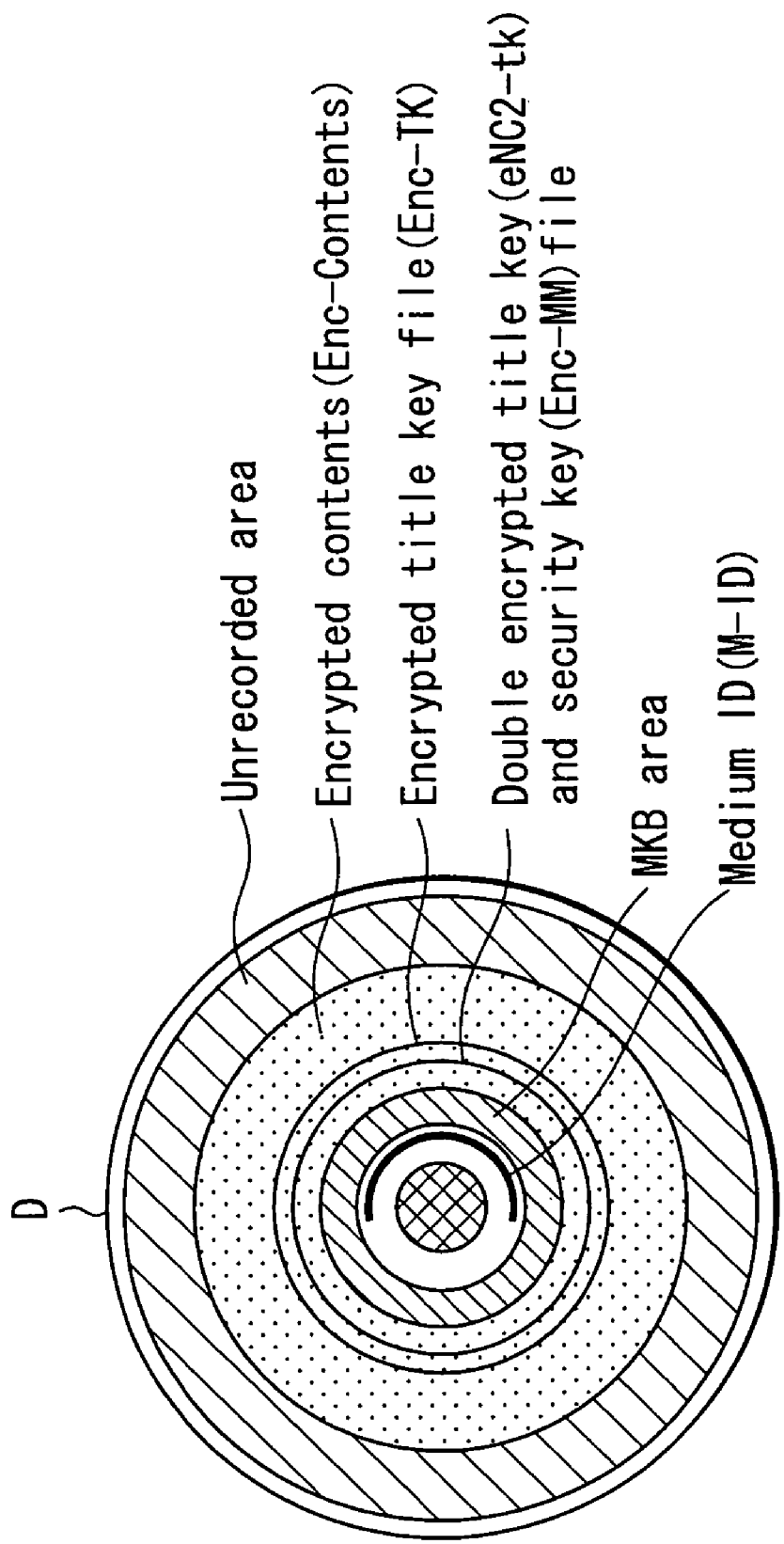
FIG. 4 is a view showing an example of a recording medium having recorded therein the contents encrypted by the content management method according to an embodiment of the present invention.
Figure 5:
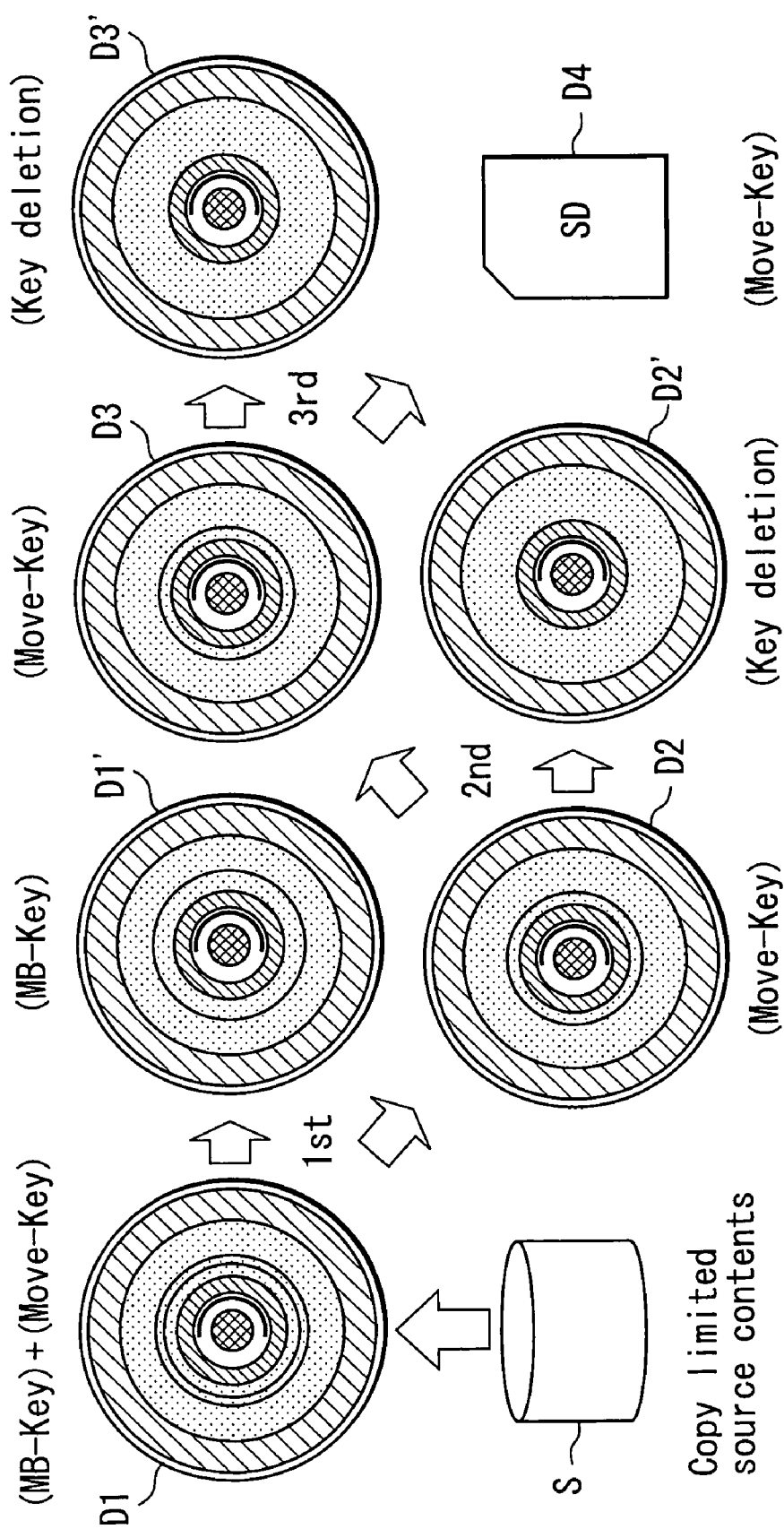
FIG. 5 is an illustrative view illustrating an example of move of a move key (Move-Key: Enc2-TK) and a medium key (MB-Key: Enc-TK) by the content management method according to an embodiment of the present invention.

Hereinafter, a content management method, a recording and/or reproducing apparatus, and a recording medium according to the present invention will be described in detail with reference to the accompanying drawings. FIG. 1 is a block diagram depicting an example of encrypting by a content management method according to the present invention. FIG. 2 and FIG. 3 are block diagrams each showing an example of decrypting by a general method for the encrypted contents. FIG. 4 shows an example of a recording medium having recorded therein the encrypted contents. FIG. 5 is an illustrative view illustrating an example of move of a move key (Move Key: Enc2-TK) and a medium key (MB-Key: Enc-TK) by the content management method according to the present invention.

<General Description of Content Management Method According to the Present Invention>

Now, a general description of the content management method according to the present invention will be given with reference to the accompanying drawings. First, an encrypting and/or decrypting scheme will be described below. The content management method according to the present invention is featured in that there are recorded in a recording medium: a move key (Move-Key: Enc2-TK) which assures movement of content data; and a medium key (MB-Key: Enc-TK) which assures reproduction by a reproducing apparatus, together with encrypted content data.

(Encrypting)

A scheme for encrypting and/or recording content data in the content management method according to the present invention can be described by working of an AV encoder module M1 and working of a drive V1. In the AV encoder module M1 of FIG. 1, a visual (V) or audio (A) signal is encoded in a DVD format by means of an encoder 12, and the encoded signal is selected together with digital data 11 by means of a selector 13. Then, the selected signal is subjected to scramble (encryption) processing in a scramble circuit 14 by means of a title key (TK), and the processed signal is recorded as (Enc-Contents) in a disk D.

At this time, the title key (TK) is generated by means of a random number generator 18. The decrypted key TK is decrypted in a decoder circuit 20 by means of a decryption key (MUK), and the decrypted title key (Enc-TK) is generated. Here, the encrypted key (MUK) having the encrypted title key (TK) is obtained as follows. By means of an MKB processor 17, a device key K1 (DvK116) is MKB-processed by using (MKB) data read out from a recording medium to generate a medium key (MMK), and further, the resultant key is generated after MID-processed by means of a MID processor 19.

Further, an encryption title key (Enc-TK) is multiply encrypted by means of a security key (MM), and a multiply encryption title key (Enc2-TK) is generated, and then, supplied to a selector 27 as with an encryption title key (Enc-TK).

Here, the security key (MM) is supplied by means of a random number generator 24. A device key (DvK2) specific to a drive V1 is subjected to MKB processing by means of an MKB processor 23 according to a given MKB from a recording medium. This security key (MM) is encrypted by means of the obtained encryption key (MMK), and an encrypted encryption key (Enc-MM) is obtained.

The thus obtained encrypted content data (Enc-Contents): a title key (Enc-TK) (=medium key (MB-key) encrypted by an encryption key (MUK); and a title key (Enc2-TK) (=move key (Move-Key)) multiply encoded by the second and third keys are each recorded in recording regions of an optical disk D. Further, the previously encrypted third key (Enc-MM) is recorded in a security region of the optical disk D. An example of recording these signals into the optical disk D is shown in FIG. 4.

That is, both of the move key (Move-Key; Enc2-TK) and the medium key (MB-Key; Enc-TK) (one of them after movement of contents) are recorded into the optical disk D via a selector 27 according to a control signal from an R-Control 15 which is a recording processing control portion.

Here, in order to achieve reproduction and exchange of information recorded in an optical disk recording medium by another reproducing apparatus, identical key information (MK) is generated with a plurality of device keys (Dvk). Further, medium binding is carried out by medium specific information (M-ID), thereby preventing full copy into another medium.

As described later in detail, when contents are copied or moved, two encryption keys, i.e., the move key (Move-Key; Enc2-TK) and the medium key (MB-Key; Enc-TK) are selectively recorded in the optical disk D, thereby enabling reproduction by a general-purpose machine under a predetermined condition or processing for moving restrictive content data.

(Two Reproducing Schemes)

With respect to an optical disk D having recorded therein the content data thus encrypted as shown in FIG. 4 and the encrypted key information, as shown below, an optical disk D having at least a medium key (MB-Key; End-TK) recorded therein can be reproduced by means of a conventional general-purpose optical disk reproducing apparatus. Further, an optical disk D having only the move key (Move-Key; Enc2-TK) recorded therein is reproduced by means of only the optical disk reproducing apparatus in which the content management method according to the present invention is carried out.

That is, FIG. 2 is a view showing a decrypting process carried out by using only the medium key (MB-Key; Enc-TK) according to the present invention with a reproducing apparatus which is a conventional general-purpose machine. In this figure, in an optical disk D having at least a medium key (MB-Key; Enc-TK) recorded therein, the medium key block information (MKB) and medium specific information (M-ID) recorded in advance in a medium; and a medium key (MB-Key; Enc-TK) are supplied to an AV decoder module M2 via a bus authentication 21. Further, encrypted content data (Enc-Contents) are supplied to an AV decoder module M2.

The encrypted content data (Enc-Contents) are processed to be de-scrambled (decryption) by means of a title key (TK) in a de-scrambler 29, and the resultant data is reproduced after supplied to an AV decoder 30. Here, the title key (TK) is obtained by an encryption title key (Enc-TK) being read out from the disk D, sent to a decrypting portion 28, and decrypted by an encryption key (MUK). In addition, as with the recording side, the encryption key (MUK) is acquired by means of the MKB processor 17 and MID processor 19 based on medium key block information (MKB) and medium specific information (M-ID).

In this manner, even in the conventional optical disk reproducing apparatus or the like which does not carry out processing by the content data management method according to the present invention, the content data contained in the optical disk D having the medium key (MB-Key; Enc-TK) recorded therein can be reproduced.

On the other hand, as shown in FIG. 3, in an optical disk D in which only the move key (Move-Key, Enc2-TK) is assigned, processing by the content data management method according to the present invention is carried out, thereby enabling reproduction.

That is, a drive V1 to which medium key block information (MKB), an encryption title key (Enc-MM), a multiply encryption title key (Enc-2-TK), and encrypted contents (Enc-Contents) are assigned from an optical disk unit obtains a security key (MM) by decrypting it by a decrypting portion 31 using a key (MMK) obtained by subjecting it to an MKB process 23 by a device key (DvK2) specific to the drive V1. In this manner, the multiply encryption title key (Enc2-TK) is decrypted into an encryption title key (Enc-TK), and is supplied to a module M2 via the bus authentication 21.

In the module M2, a device key (DvK) specific to the module M2 is subjected to an MKB process 17 based on the medium key block information (MKB), and the encrypted title (Enc-TK) is decrypted at a decrypting portion 28 by means of the encryption key (MUK) obtained by subjecting it to an MID process 19 based on medium specific information (M-ID), thereby obtaining a title key (TK).

Using this title key (TK), the encrypted content data (Enc-Contents) is decrypted by means of a de-scramble portion 29, whereby the content data can be supplied to an AV decoder 30.

In this manner, in a disk D in which only the move key (Move-Key; Enc2-TK) is assigned, reproduction or move which will be described later is enabled only by an optical disk recording and/or reproducing apparatus which carries out processing by the content data management method according to the present invention.

(Moving Contents by the Content Management Method According to the Present Invention)

Now, a general description of an scheme for moving content data by the content data management method according to the present invention will be given by way of example. In FIG. 5, in the content data management method according to the present invention, two types of keys, i.e., a move key (Move-Key; Enc2-TK) and a medium key (MB-Key; Enc-TK) are used, and these keys are recorded in a recording medium as required, whereby restriction on reproduction, copy, or move can be applied. That is, according to the content data management method according to the present invention, there exist three types of recording mediums such as an optical disk, "a medium key (MB-Key) and a move key (Move-Key)", "only a medium key (MB-Key)", and "only a move key (Move-Key)". Here, a description of content data or the like is eliminated, and only the two keys, i.e., the medium key and move key, will be generally described.

In FIG. 5, with respect to copy limited source contents S, a medium key (MB-Key) and a move key (Move-Key) are assigned to a first disk D1 (recording medium). In this manner, reproduction by a reproducing apparatus according to the present invention as well as a general reproducing apparatus is enabled.

Next, in the case where the content data in the disk D1 is moved to a new disk D2 by means of the reproducing apparatus according to the present invention, the move key (Move-Key) is deleted from the disk D1, and a disk D1' having only the medium key (MB-Key) is obtained only the move key (Move-Key) is recorded in the new disk D2. In this manner, the disk D1' can be reproduced by the general reproducing apparatus only. In addition, the disk D2 cannot be reproduced by the general reproducing apparatus. This disk can be reproduced or processed to be moved by only the recording and/or reproducing apparatus according to the present invention.

Further, in the case where the content data in the disk D2 which serves as such a move key (Move-Key) is moved to a new optical disk D3, the move key (Move-Key) of the optical disk D2 is deleted by means of the reproducing apparatus according to the present invention, and cannot be reproduced again. Only the move key (Move-Key) is recorded in the optical disk D3, and the disk can be reproduced or processed to be moved by only the recording and/or reproducing apparatus according to the present invention.

Furthermore, in moving the content data from the optical disk D by the recording and/or reproducing apparatus according to the present invention, the target is not limited to the optical disk. A general digital recording medium such as an SD (Secure Digital) card is also targeted to be moved. Here, the move key (Move-Key) can be moved from the optical disk D3 to the SD (Secure Digital) card D4. As is the case with moving the optical disk D3 from the previous optical disk D2, the move key (Move-Key) is deleted from the optical disk D3, and cannot be reproduced. Only the move key (Move-Key) is recorded in the SD (Secure Digital) card D4, and the disk can be reproduced or processed to be moved by only the recording and/or reproducing apparatus according to the present invention.

<Application Example of the Content Management Method According to the Present Invention>

Figure 6:
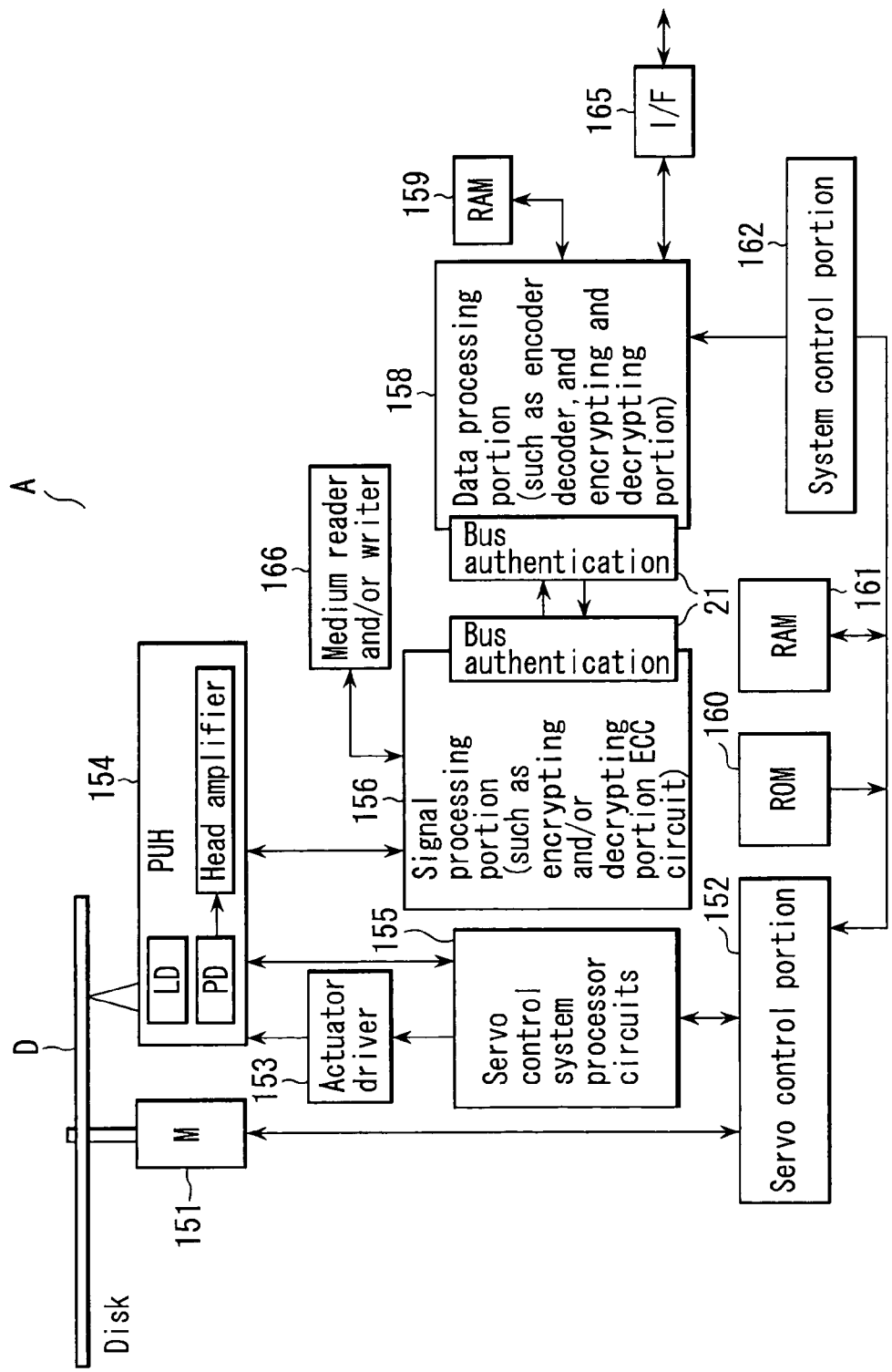
FIG. 6 is a block diagram depicting an example of a structure of a recording and/or reproducing apparatus to which the content management method according to an embodiment of the present invention is applied.
Figure 7:
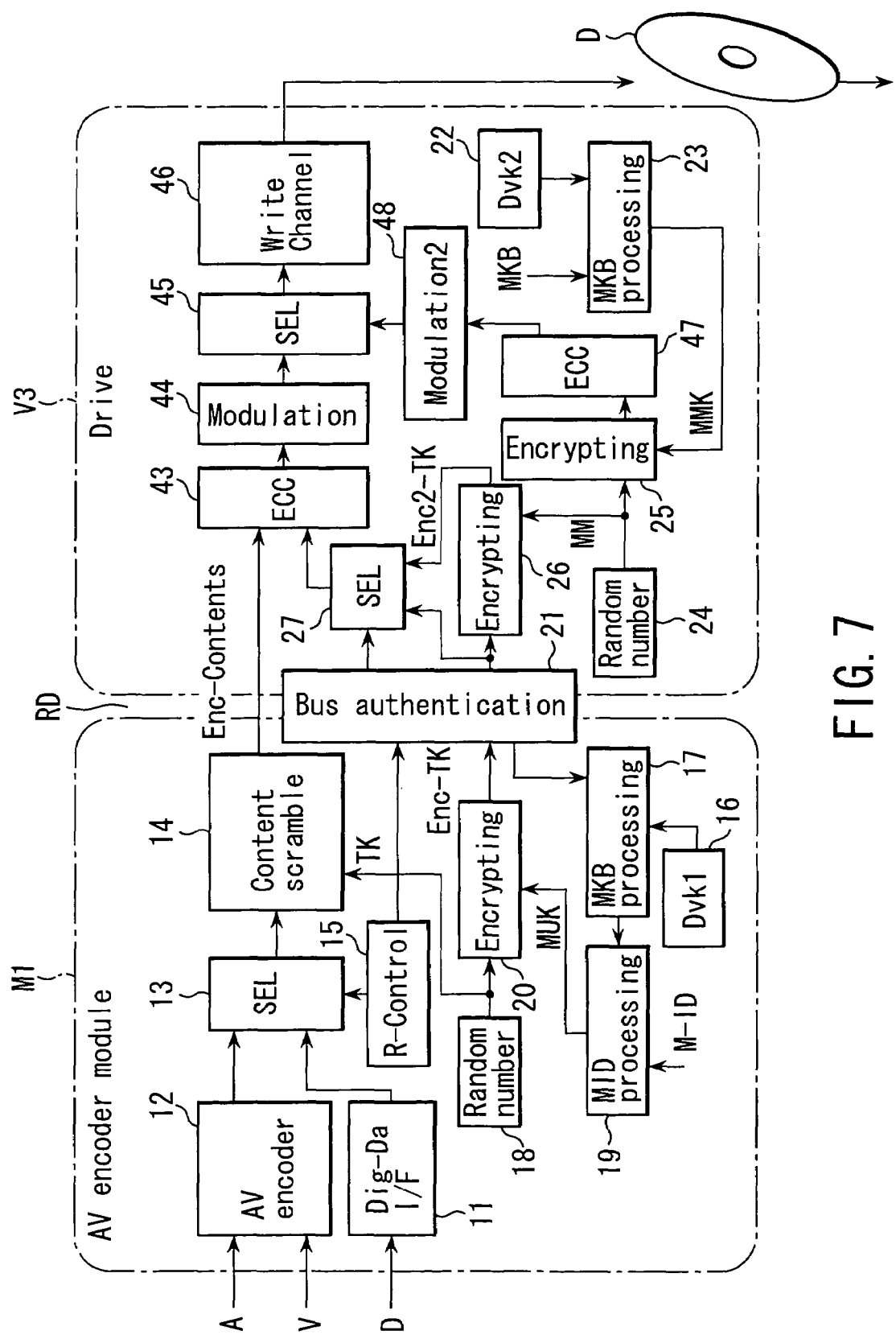
FIG. 7 is a block diagram illustrating a detailed example of an encrypting scheme in the case where the content management method according to an embodiment of the present invention is applied to the recording and/or reproducing apparatus.
Figure 8:
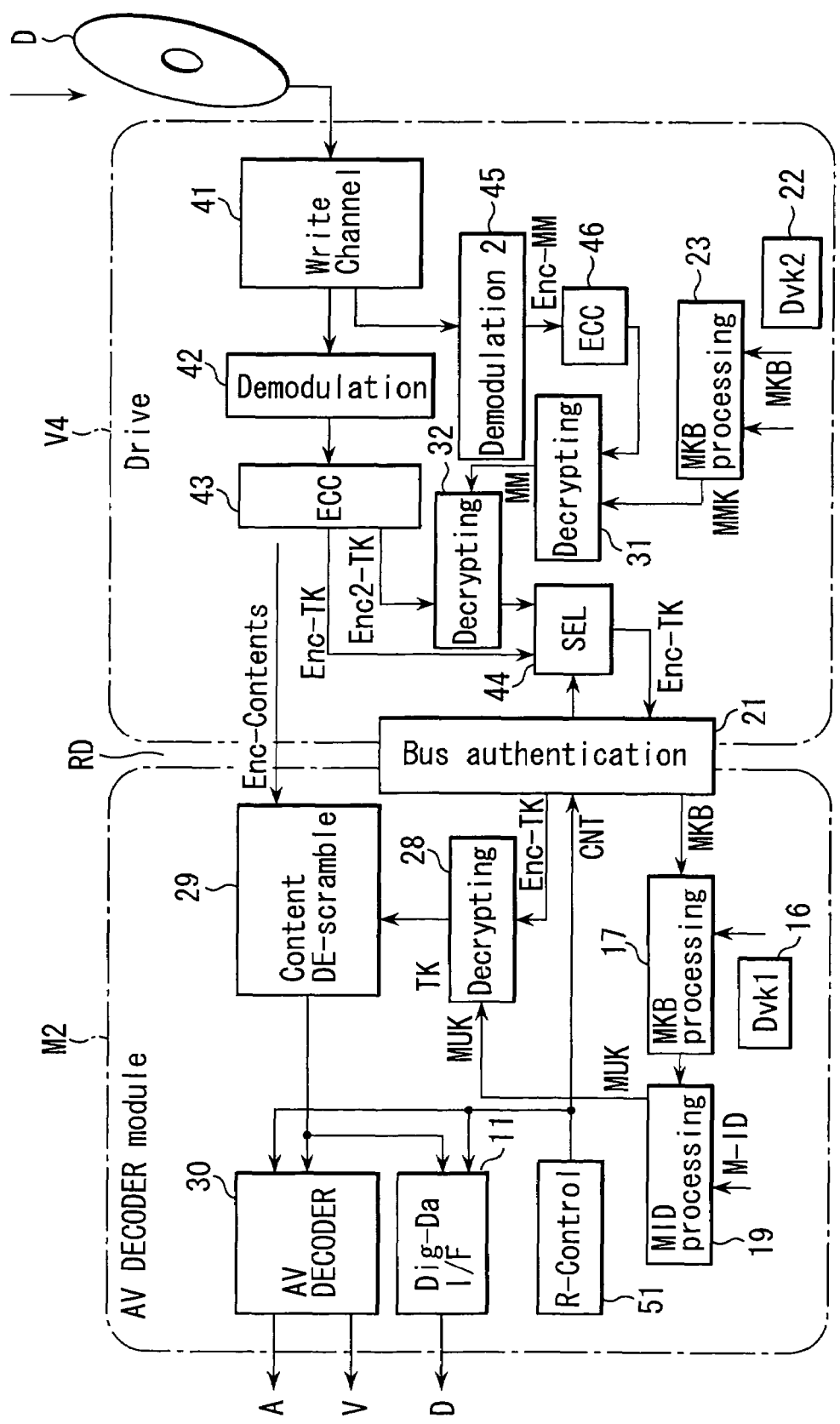
FIG. 8 is a block diagram illustrating a detailed example of a decrypting scheme in the case where the content management method according to an embodiment of the present invention is applied to the recording and/or reproducing apparatus.

Now, an embodiment in the case where the content management method according to the present invention is applied to a specific optical disk recording and/or reproducing apparatus will be described in detail with reference to the accompanying drawings. FIG. 6 is a block diagram depicting an example of a structure of a recording and/or reproducing apparatus to which the content management method according to the present invention is applied. FIG. 7 is a block diagram illustrating a detailed example of a decrypting scheme in the case where the scheme is applied to the recording and/or reproducing apparatus. FIG. 8 is a block diagram illustrating a detailed example of a decrypting scheme.

(Recording and/or Reproducing Apparatus)

FIG. 6 shows an optical disk recording and/or reproducing apparatus A to which the content management method according to the present invention is applied. The optical disk recording and/or reproducing apparatus A has a control portion consisting of: a system control portion 162 which governs the entire operation; a RAM 161 serving as a work area; a ROM 160; and a servo control portion 152. Further, this apparatus has an optical pickup 154 which irradiates laser beam to an optical disk D; and a signal processing portion 156 which receives a detection signal for reproduction or supplies a signal for recording, thereby carrying out ECC processing or the like. The apparatus A has a bus authenticating portion 21 described previously in FIG. 1 or the like. Further, the apparatus has a bus authenticating portion 21 provided via a cable similarly, and has a data processing portion 158 which carries out encoding or decoding and the like. In addition, a medium reader and/or writer 166 which is an interface for a recording medium such as an SD card is connected to the signal processing portion 156. An interface 165 which carries out signal input or output with a RAM 159 or an external device is connected to the data processing portion 158. Furthermore, the apparatus A has: servo control system processor circuits 155 connected to the above described servo control portion 152; an actuator driver 153 connected thereto; and a disk motor 151.

In the optical disk unit A having such a configuration, the system control portion 162 uses the RAM 161 as a work area, and carries out predetermined operation in accordance with a program including the present invention, the program being recorded in the ROM 160. The laser beam outputted from the optical pickup 154 is irradiated on an optical disk D. The reflection light from the optical disk D is converted into an electrical signal by means of a head amplifier. This electrical signal is inputted to the signal processing portion 156. An RF amplifier or the like is included in the signal processing portion 156.

During recording operation, the encrypting process described in detail with reference to FIG. 1 is applied to content data, and a recording process is carried out for the optical disk D. In more detail, the data processing portion 158 assigns an error detecting code (EDC) or ID to content data sent via the interface 165 by using a write clock produced via a write channel circuit (not shown), and applies data scramble processing using the above described encoding. Further, this data processing portion assigns an error correcting code (ECC), assigns a synchronizing signal, modulates a signal other than the synchronizing signal, and records a signal in the optical disk D by using the laser beam controlled by right strategy optimal to a compatible medium.

During reproducing operation, the decoding process described in detail with reference to FIG. 2 and FIG. 3 is applied to content data, and reproduction processing of the content data stored in the optical disk D is carried out. In more detail, the RF signal read out from the head amplifier of the optical pickup 154 is sent to a PLL circuit (not shown) in the signal processing portion 156 through an optimal equalizer. Channel data is read out by a read clock produced by a PLL circuit. The decrypting process using the above described decrypting is applied to the read data. Further, the decrypted data is synchronized by means of the data processing portion 158, and symbol data is read out. Then, a de-scramble process using error correction or the above described decrypting process is carried out, and the de-scrambled data is transferred to the outside through the interface 165.

In this manner, the recording process and reproducing process is applied by means of the above described optical disk recording and/or reproducing apparatus A.

In addition, the signal processing portion 156 and data processing portion 158 each has a bus authenticating portion 21, and provides safeguard against a third person who extracts a signal by disconnecting a cable from both parties, and attempts to make illegal copy. That is, each bus authenticating portion 21 has a random number generator (not shown). In this manner, this generator generates the same encryption key, encrypts transmission information, and transmits it to the remote party. The remote device having received transmission signal decrypts the encrypted transmission information by the same encryption key which has been locally generated. This encryption key is changed and generated according to a predetermined time, thus making it difficult for the third person to reproduce it. As long as the encryption key at this time cannot be reproduced, even if a signal is extracted by cable disconnection, illegal copy of content data or the like cannot be made.

(Security of Encryption Key by Modulation and/or Demodulation Process)

A security process for encryption key information having applied thereto an operation of a modulator and/or demodulator circuit carried out by the signal processor circuit 156 will be described here. At essential portions of the content management method for the recording process shown in FIG. 7, an AV encoder module M1 is identical to that shown in FIG. 1. At essential portions of the content management method for the recording process shown in FIG. 8, an AV decoder module M2 is identical to that shown in FIG. 3. A duplicate description is omitted here.

At a drive portion V3 of FIG. 7, in addition to a configuration of the drive V1 of FIG. 1, an ECC circuit or the like is shown. That is, a signal from a content scramble 14 which is main data is modulated by means of a modulator circuit 44 when an error correcting signal is assigned by means of an ECC circuit 43. Further, an encrypted security key (Enc-MM) as well is subjected to error correction encoding by means of an ECC circuit 47, and the encrypted key is modulated by means of a second modulator circuit 48. Then, the modulated key is replaced with part of the main data by means of a selector 45, and is recorded in a storage region of the optical disk D by means of a write channel circuit 46.

On one hand, at a drive portion V4 of FIG. 8, data to which an error correction code is assigned is read out from the optical disk D, and the read out data is demodulated by means of the second modulator circuit 45. Then, an encrypted security key (Enc-MM) can be extracted by means of the ECC circuit 46. On the other hand, in FIG. 7, the encrypted security key (Enc-MM) is modulated and recorded by using the second modulator 48 which is different from the modulator 44 for main data. Thus, the encrypted security key (Enc-MM) cannot be demodulated at the demodulator 42 for main data at a readout portion, and the key is processed as error data. In this manner, the third person cannot extract the encrypted security key (Enc-MM) for the purpose of illegal copy. By thus applying the modulation and/or demodulation process, security information which cannot be detected by general main data modulation processing can be produced. In addition, processing can be carried out in the same manner such that encrypted key information (Enc-MM) is substantially recorded and reproduced in a security region. In this manner, even with a passive recording medium such as an optical disk, it becomes possible to construct a high level protection system.

(Moving Flow Chart 1)

Figure 9:
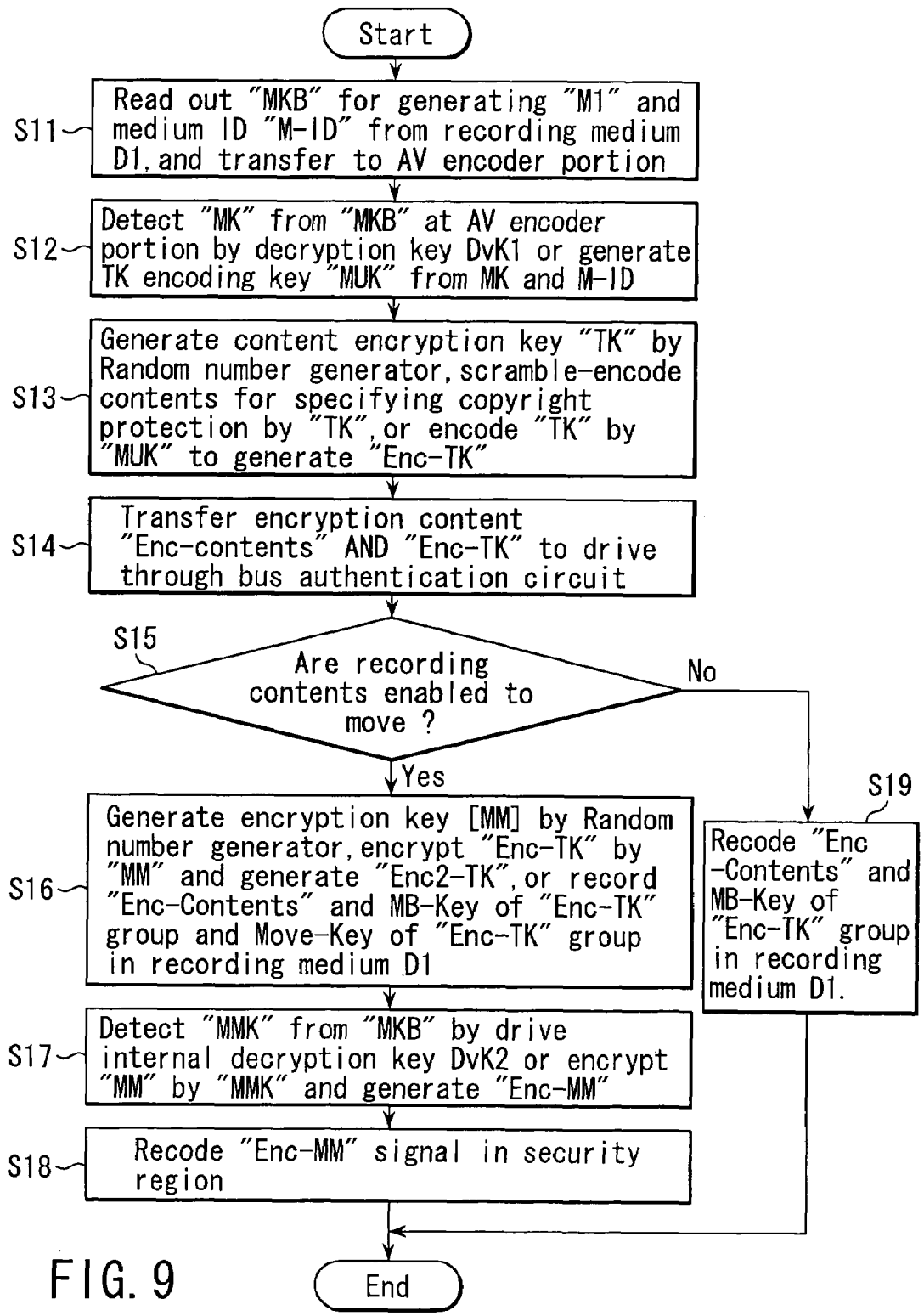
FIG. 9 is a flow chart showing an operation for recording in a recording medium D1 the contents and key information encrypted by the content management method according to an embodiment of the present invention.
Figure 10:
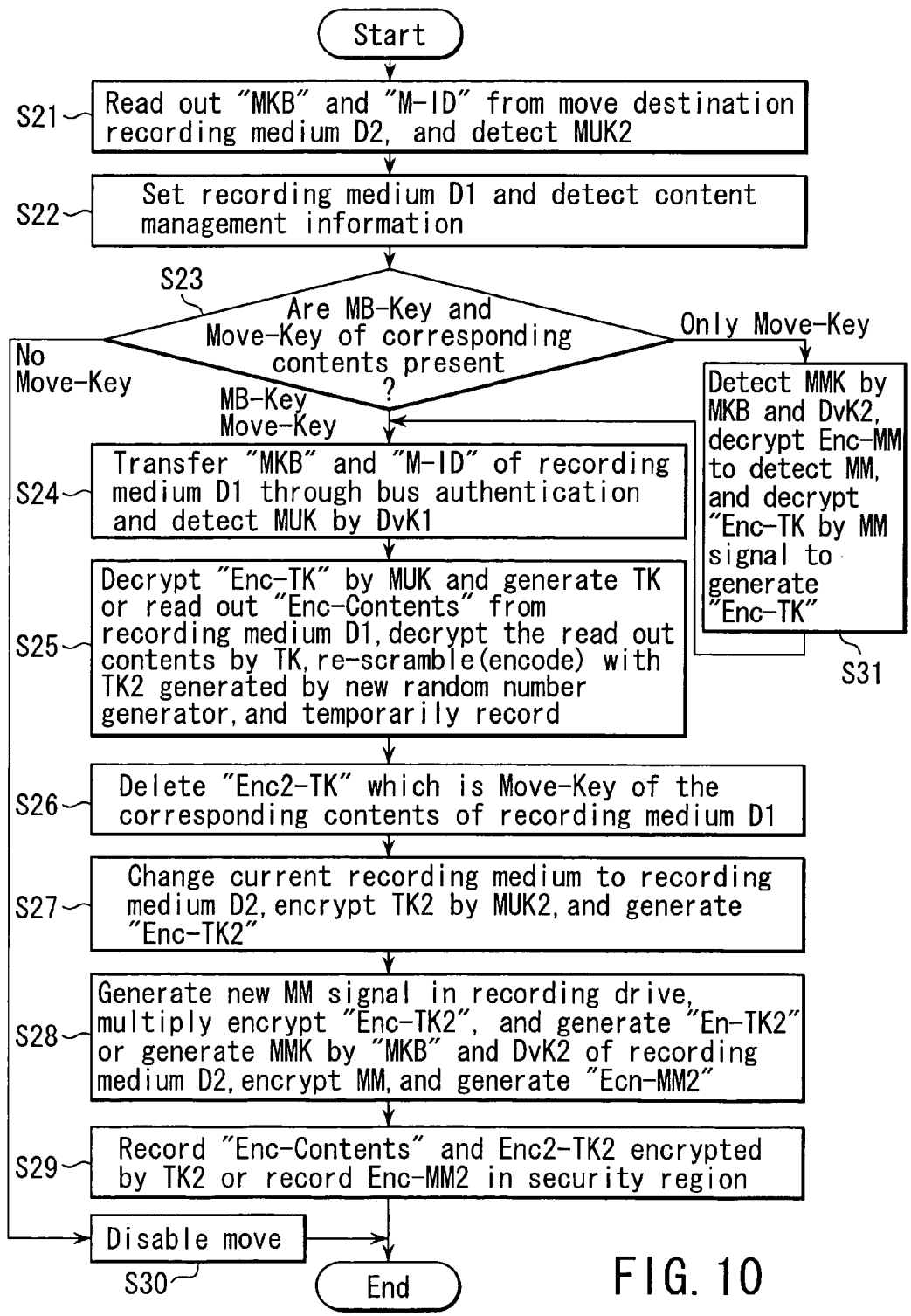
FIG. 10 is a flow chart showing an operation in the case where contents are moved from a recording medium D2 having recorded therein the contents encrypted by the content management method according to an embodiment of the present invention to another recording medium D2.
Figure 11:
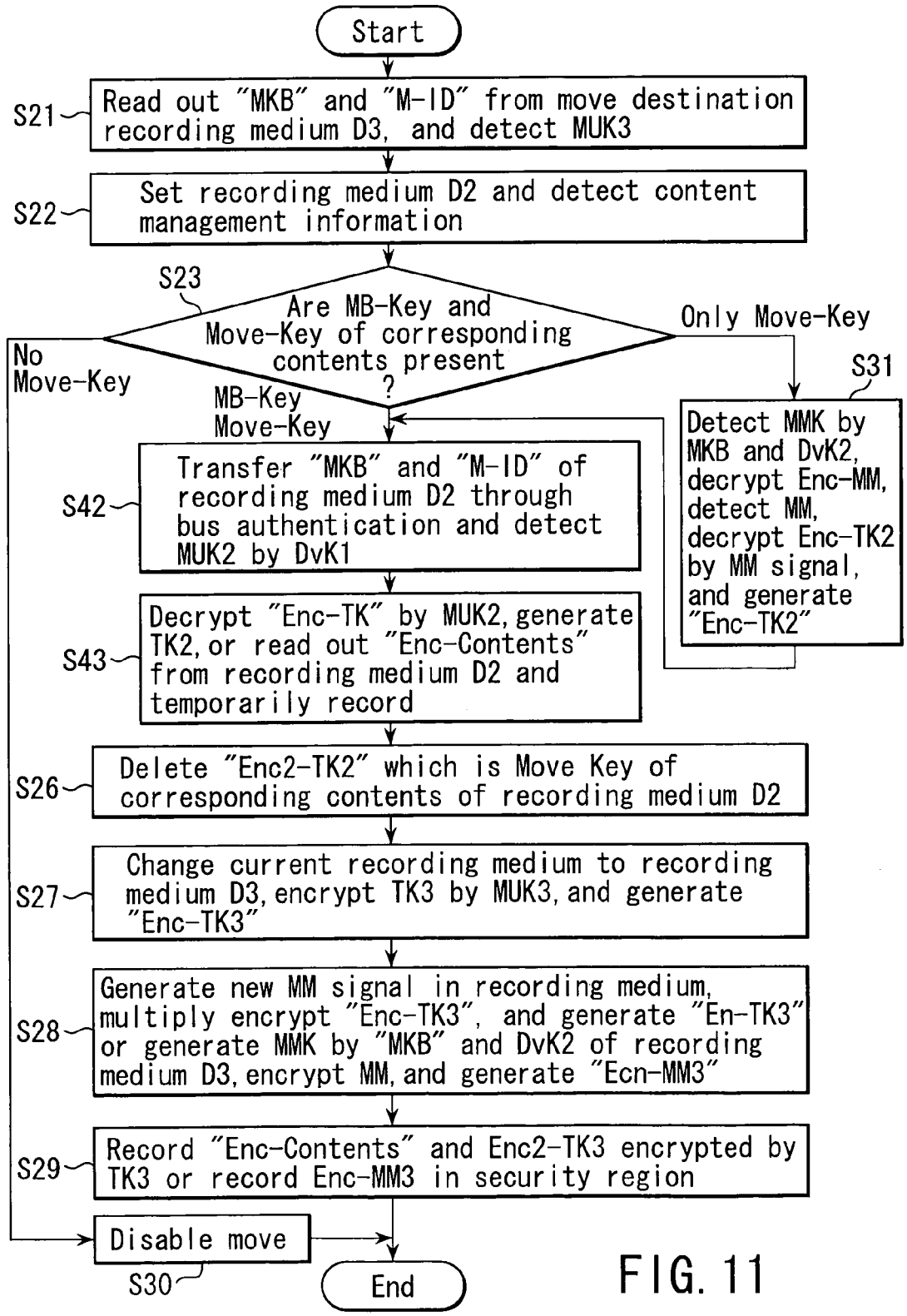
FIG. 11 is a flow chart showing an operation in the case where contents are moved from the recording medium D2 having recorded therein the contents encrypted by the content management method according to an embodiment of the present invention to another recording medium D3.
Figure 12:
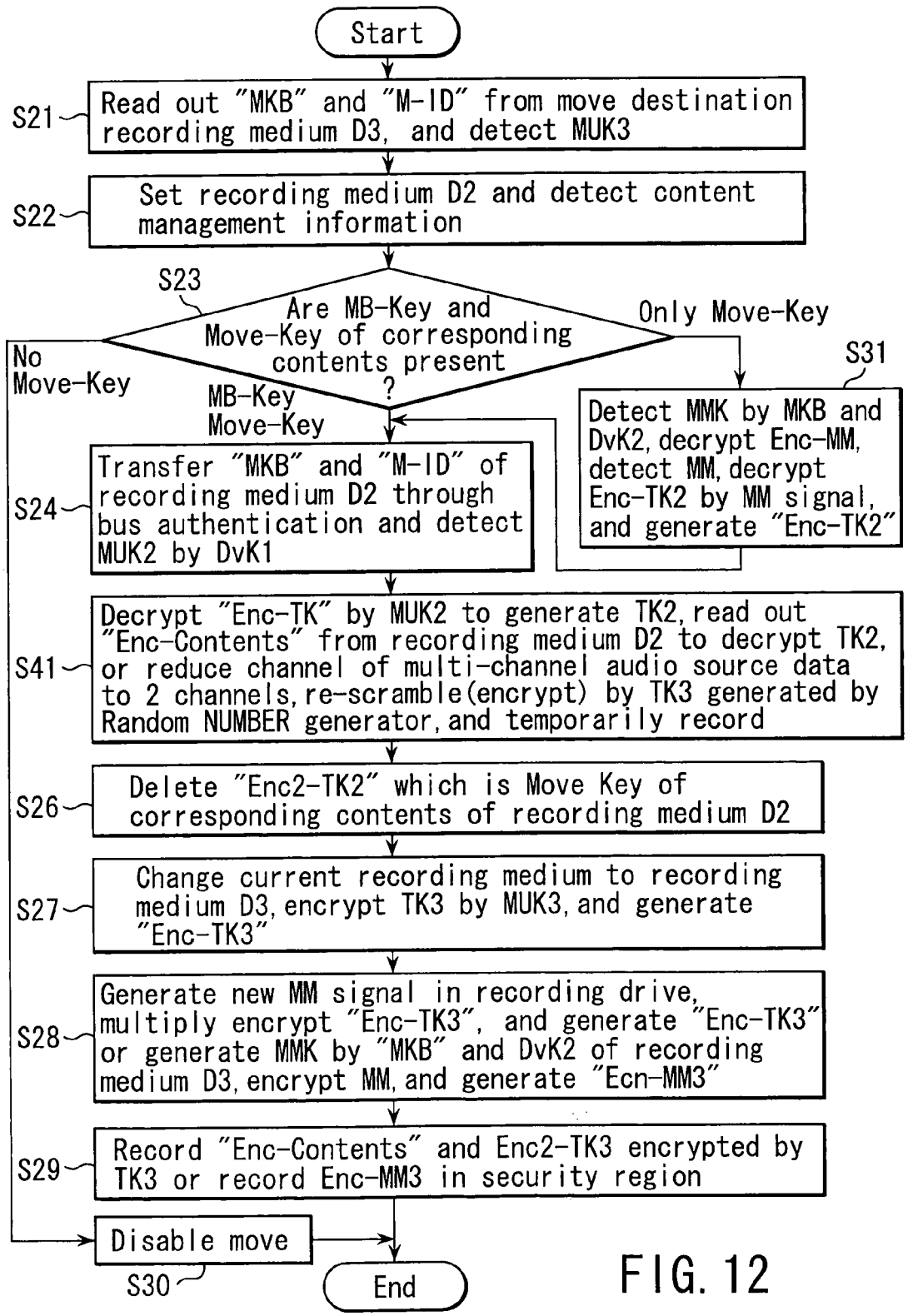
FIG. 12 is a flow chart showing an operation in the case where movement of contents are carried out with channel down from the recording medium D2 having recorded therein the contents encrypted by the content management method according to an embodiment of the present invention to such another recording medium D3.

A process for moving content data briefly described previously between recording mediums will be described in detail by way of flow chart. FIG. 9 is a flow chart showing an operation for recording into a recording medium D1 the contents and key information encrypted by the content management method according to the present invention. FIG. 10 is a flow chart showing an operation in the case where contents are moved from the recording medium D1 to another recording medium D2. FIG. 11 is a flow chart showing an operation in the case where contents are moved from the recording medium D2 to another recording medium D3. FIG. 12 is a flow chart showing an operation in the case where this moving is carried out with channel down.

The content management method according to the present invention is achieved with a configuration of the signal processing portion 156 and data processing portion 158 in the optical disk recording and/or reproducing apparatus, as described above. These processes can be carried out even by means of a program or the like describing procedures for applying the content management method to detection information. Hereinafter, the content management method according to the present invention will be described in detail by way of flow chart.

In the flow chart shown in FIG. 9, a description will be given with respect to a case in which content data is copied from copy limited content data S to a recording medium D1 such as an optical disk D.

First, medium key block information (MKB) for generating key information (MK); and medium specific information (M-ID) are read out from the recording medium D1, and these items of information are transferred to an AV encoder portion M1 (S11). Then, at the AV encoder portion M1, key information (MK) is extracted from the medium key block information (MKB) by using a device specific decryption key (DvK1) 16. Then, an encryption key (MUK) for encrypting a title key is generated from the key information (MK) and the medium specific information (M-ID) (S12).

Next, a title key (TK) is generated by means of a random number generating process. Then, the content data for which copyright protection has been specified is scramble-encrypted by means of the title key (TK) (S13). Then, the title key (TK) is encrypted by means of a key (MUK) for encrypting a title key, and the encryption title key (Enc-TK) is generated (S13). Then, the encrypted contents (Enc-Contents) and encryption title key (Enc-TK) are transferred to the drive V1 via a bus authenticating portion (S14).

Here, it is determined whether or not recording contents are enabled to be moved (S15). When the determination result is affirmative, a security key (MM) is generated by means of a random number generating process. Then, the encryption title key (Enc-TK) is multiply encrypted by means of the security key (MM), and a multiply encryption title key (Enc2-TK) is generated. Then, a medium key (MB-Key) for the encrypted contents (Enc-Contents) and a group of encryption title keys (Enc-TK) and a move key (Move Key) for a group of the multiply encryption title keys (Enc2-TK) are recorded in the recording medium D1 (S16).

Further, by means of a device key (DvK2) in the drive V1, an encryption key (MMK) is detected based on medium key block information (MKB). A security key (MM) is encrypted by means of the encryption key (MMK), and an encrypted encryption key (Enc-MM) is generated (S17). Then, a signal of the encrypted encryption key (Enc-MM) is recorded in a security region (S18).

If the determination result is negative in the step S15, a medium key (MB-Key) for encrypted contents (Enc-Contents) and a group of encryption title keys (Enc-TK) is recorded in the recording medium D1 (S19).

By means of these processes, content data is encrypted, and both of the move key (Move-Key; Enc2-TK) and the medium key (MB-Key; Enc-TK) or only the medium key, which are features of the content management method according to the present invention, are/is recorded in the optical disk D1.

(Moving Flow Chart 2)

In the flow chart shown in FIG. 10, a description will be given with respect to an operation in the case where contents are moved from a recording medium D1 to another recording medium D2.

First, medium key block information (MKB) and medium specific information (M-ID) are read out from a move destination recording medium D2, and an encryption key (MUK2) is generated therefrom. Next, a recording medium D1 is set, and content management information is detected (S22). Here, it is determined whether or not the corresponding content medium key (MB-Key) and move key (Move-Key) are present (S23).

When it is determined that only the move key (Move-Key) is present in the step S23, an encryption key (MMK) is detected by using medium key block information (MKB) and a device key (DvK2). Then, an encrypted encryption key (Enc-MM) is decrypted, and a security key (MM) is detected. Then, a multiply encryption title key (Enc2-TK2) is decrypted by means of a security key (MM), and an encryption title key (Enc-TK) is generated (S31).

When both of the medium key (MB-Key) and move key (Move-Key) are present at the step S23, the medium key block information (MKB) in the recording medium D1 and medium specific information (M-ID) are transferred through bus authentication, and an encryption key (MUK) is detected by means of a device specific encryption key (DvK1) (S24). Further, an encryption title key (Enc-TK) is decrypted by means of an encryption key (MUK), and a title key (TK) is generated. Furthermore, encrypted contents are read out from the recording medium D1, and the read out contents are decrypted by means of a title key (TK). Then, the decrypted contents are re-scrambled (encrypted) by means of a title key (TK2) generated by a new random number generator, and the encrypted contents are temporarily recorded (S25). Then, a multiply encryption title key (End2-TK) which is a move key (Move-Key) of the corresponding contents of the recording medium D1 is deleted (S26).

Then, the current recording medium is changed to a recording medium D2; a title key (TK2) is encrypted by means of an encryption key (MUK2); and an encryption title key (Enc-TK2) is generated (S27). Then, a new security key (MM2) in a recording drive is generated; an encryption title key (Enc-TK2) is multiply encrypted; and a multiply encryption title key (Enc2-TK2) is generated.

Then, an encryption key (MMK) is generated by using the medium key block information (MKB) in the recording medium D2; and the device key (DvK2); a security key (MM2) is encrypted; and an encrypted encryption key (Enc-MM2) is generated (S28). Next, the encrypted contents (Enc-Contents) encrypted by the title key (TK2) and the multiply encryption title key (Enc2-TK2) are recorded in the recording medium D2. Further, the encrypted encryption key (Enc-MM2) is recorded in a security region (S29).

In addition, when no move key (Move-Key) is present in the step S23, moving is disabled (S30).

In this manner, the move key (Move-Key) is deleted from the move source recording medium D1, and only the medium key (MB-Key) is obtained. Then, moving of content data is disabled. As a result, reproduction can be carried out by means of a reproducing apparatus which is a conventional general-purpose machine, but moving of the content data is disabled. On the other hand, only the move key (Move-Key) is present in the move destination recording medium D2. Reproduction and further moving are enabled with only a dedicated machine capable of implementing the content management method according to the present invention.

(Moving Flow Chart 3)

In the flow chart shown in FIG. 11, a description will be given with respect to an operation in the case where contents are moved from the recording medium D2 to another recording medium D3.

First, medium key block information (MKB) and medium specific information (M-ID) are read out from the move destination recording medium D3, and an encryption key (MUK2) is generated (S21).

Next, the recording medium D2 is set, and content management information is detected (S22). Then, it is determined whether or not the corresponding content medium key (MB-Key) and move key (Move-Key) are present (S23).

When no move key (Move-Key) is present, moving content data is disabled (S30).

When it is determined that only the move key (Move-Key) is present, an encryption key (MMK) is extracted by using medium key block information (MKB) and a device key (DvK2). Then, an encrypted encryption key (Enc-MM is decrypted), and a security key (MM) is detected. Then, a multiply encryption title key (Enc2-TK2) is decrypted by means of a security key (MM), and an encryption title key (Enc-TK2) is generated (S31).

When it is determined that the medium key (MB-Key) and move key (Move-Key) are present in the step S23, the medium key block information in the recording medium D2 and the medium specific information (M-ID) are transferred through bus authentication. Then, an encryption key (MUK2) for a title key is detected by means of a device specific decryption key (DvK1) (S42). Next, an encryption title key (Enc-TK) is decrypted by means of a decryption key (MUK3) for a title key, and a title key (TK2) is detected. Then, encrypted contents (Enc-Contents) are read out from the recording medium D2, and the read out contents are temporarily stored (S43). Then, a multiply encryption title key (Enc2-TK2) which is a move key (Move-Key) for the corresponding contents of the recording medium D2 is deleted (S26).

Next, the current recording medium is changed to a recording medium D3; a title key (TK3) is encrypted by means of an encryption key (MUK3); and an encryption title key (Enc-TK3) is generated (S27). Next, a new security key (MM3) in the recording drive is generated; an encryption title key (Enc-TK3) is multiply encrypted; and a multiply encryption title key (Enc2 TK3) is generated. Then, an encryption key (MMK) is generated by using the medium key block information (MKB) in the recording medium D3 and the device key (DvK2); a security key (MM3) is encrypted; and an encrypted encryption key (Enc-MM3) is generated (S28). Then, the encrypted contents (Enc-Contents) encrypted by the title key (TK2) and the multiply encryption title key (Enc2-TK2) are recorded in the recording medium D3, and the encrypted encryption key (Enc-MM3) is recorded in the security region (S29). The encryption title key (Enc-TK3) in the flow chart 3 of FIG. 11 includes a plurality of the steps common to the flow chart 2 of FIG. 10, but is different therefrom in that, in the steps S42 and S43, the title key (TK2) is encrypted by means of the encryption key (MUK2), and the encryption title key (Enc-TK3) is generated.

In this manner, in the move source recording medium D2, the move key (Move-Key) is deleted, thus making it impossible to move or reproduce content data. On the other hand, in the move destination recording medium D3, only the move key (Move-Key) is obtained, thus enabling reproduction and further moving by only the dedicated machine capable of implementing the content management method according to the present invention.

In addition, a recording medium targeted by the content management method according to the present invention is not limited to an optical disk, and can include a general digital recording medium such as an SD (Secure Digital) card D4 or the like, as shown in FIG. 5.

(Moving Flow Chart 4)

Further, in a process for moving content data shown in the flow chart of FIG. 11, a description will be given with respect to a case in which multi-channel audio source data (5.1 channels) is processed by reducing the channel down to 2 channels. These processes are basically identical to those shown in the flow chart of FIG. 11. The step S42 and step S43 in the flow chart of FIG. 11 are carried out by means of a process substituted for the step S44.

That is, in the step S41 of the flow chart of FIG. 12, an encryption title key (Enc-TK) is decrypted by means of an encryption key (MUK2), and a title key (TK2) is generated. Then, encrypted contents (Enc-Contents) are read out from the recording medium D2, and the read out contents are decrypted by means of a title key (TK2). Further, multi-channel audio source data is reduced down to 2 channels; the data is scrambled (encrypted) again by means of a title key (TK3) generated by a random number generator, and the encrypted data is temporarily recorded (S41).

In such a process, while audio source data (5.1 channels) is reduced down to 2 channels, content data can be moved from the recording medium D2 to a new recording medium D3. Its advantageous effect is identical to the moving process in the flow chart of FIG. 11.

(Method for Increasing Key Information and Key for Each Music Item File)

Furthermore, content data targeted by the content management method according to the present invention can take a form of a plurality of voice files as music information on a plurality of music items, for example. A plurality of information may be stored in a visual image file or an image file, for example. Here, a description will be given by way of example of voice file. In this form, different title keys (TK) supplied by a random number generator 18 shown in FIG. 1 are provided on a file by file basis, and each of these keys is encrypted, thereby enabling move to another recording medium for each music item of music information. In this manner, the degree of freedom for user's content utilization can be improved very remarkably.

However, if move keys (move-Key=Enc2-TK) are generated to be associated with a plurality of title keys (TK) on a one by one basis, there occurs a need to provide security keys (MM) in the drive portion V1 by the number of a plurality of music files. However, if the security keys (MM) are provided by the number of music items, and then, all of these keys are stored in a security region of an optical disk D, it is not preferable since the security region requires a large storage capacity, causing an increase in storage capacity. In particular, in a security information recording system using the above modulation and/or demodulation process, while part of the main data is damaged, and security information is recorded. This situation is not preferable in reproduction processing of the main data, and thus, it is desirable to reduce security information to the minimum.

Because of this, a plurality of keys are increased in accordance with predetermined procedures based on a security key (MM); the increased keys are used for encryption; and only the security key (MM) which is a source of increase is stored in the security region, thereby making it possible to manage a plurality of files, while reducing the storage capacity of the security region.

Figures 13, 14:
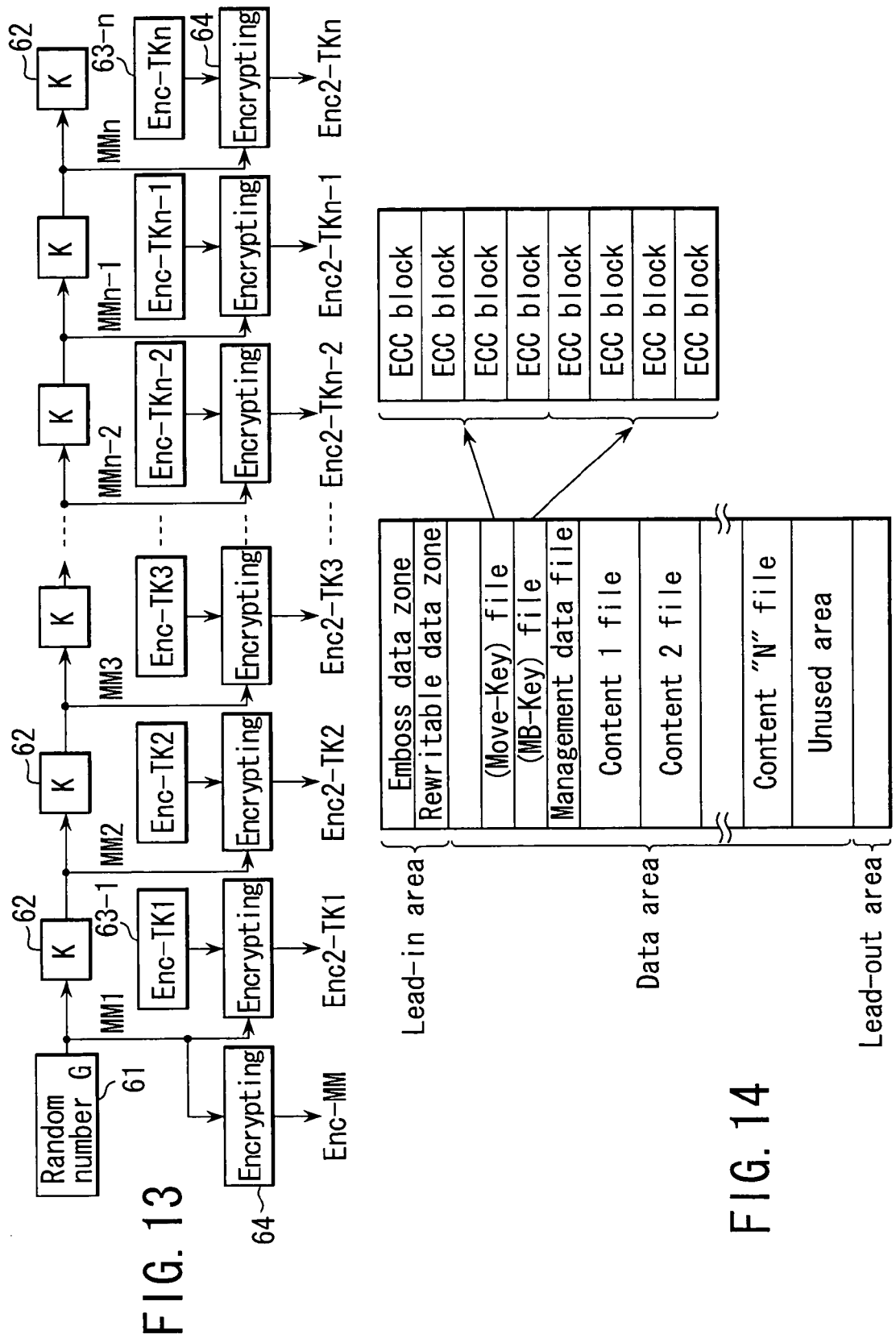
FIG. 13 is a view showing an scheme for generating a security key (MM) in the content management method according to an embodiment of the present invention.
FIG. 14 is a view showing an example of a storage region for a move key (Move-Key: Enc2-TK) and a medium key (MB-Key: Enc-TK) in a recording medium in the content management method according to an embodiment of the present invention.

FIG. 13 is a view showing a scheme for generating a security key (MM) in the content management method according to the present invention. In this figure, in the random number generator 24 or the like of FIG. 1, a security key (MM1) is generated based on key source data (MM) generated from a random number generator 61, and then, a specific function K is multiplied by a content data identification code or the number determined by order numbers or the like, whereby new security keys (MM2 to MMn) are generated. By using a plurality of these security keys (MM2 to MMn), a plurality of encryption title keys (Enc-TK1 to Enc-TKn) 63-1 to n are subjected to encryption 64.

However, only the encrypted encryption key (Enc-MM) having key source data (MM) encrypted therein may be stored in the security region, and thus, the required storage capacity of the security region is not increased. Therefore, it becomes possible to manage contents of a number of plural files while maintaining high security.

(Management Information)

In the content management method according to the present invention, reproduction or moving of content data is managed by means of a move key (Move-Key) and a medium key (MB-key). Thus, these encryption key files are especially important data as is the case with encrypted contents. That is, if an encrypted encryption key cannot be decrypted, the encrypted contents cannot be decrypted or reproduced, either. Because of this, as shown in FIG. 14, in a data area of a recording medium (for example, an optical disk), a move key (Move-Key) file and a medium key (MB-Key) file are provided in different file regions. Then, one table is allocated in each ECC block, and each table is written in quadruple in 4 ECC blocks, thereby improving data reliability.

A table of these files is shown in FIG. 15. That is, in a recording medium, there exist three types of keys, "a medium key (MB-Key) and a move key (Move-Key)", "only a medium key (MB-Key)", and "only a move key (Move-key)". In addition, in the case where a large number of content files exist, it is required to easily read out a relationship between the medium key (MB-Key) and move key (Move-Key) relevant to a respective one of the content encryption keys from individual management. Because of this, in the move key (Move-Key) table and the medium key (MB-Key) table shown in FIG. 15, these tables are configured by providing a pair of information, i.e., information indicating the presence or absence of an encryption key associated with a respective one of the encrypted encryption keys and information utilized in the case where the method for generating the security key (MM) shown in FIG. 13 is employed. By listing these tables, it becomes possible to easily determine whether moving contents is enabled with respect to the respective content data.

By a variety of embodiments described above, one skilled in the art can achieve the present invention. Further, a variety of modifications of these embodiments can be easily conceived by one skilled in the art, and can be applied to a variety of embodiments even if one skilled in the art does not have inventive ability. Therefore, the present invention covers a broad range which is not contradictory to the disclosed principle and novel features, and is not limited to the above described embodiments.

For example, with respected to a security region in which a security key is to be stored, when the above described modulation and/or demodulation process is used, a region for recording and/or reproducing security information may be associated with a recording and/or reproducing area other than main data. By employing such a method, the main data does not include an error component, and thus, the reliability of content data is not lost.

As has been described in detail, according to the present invention, the move key (Move-key: Enc2-TK) for assuring movement of content data and the medium key (MB-Key: Enc-TK) for assuring reproduction by a reproducing apparatus which is a conventional general-purpose machine (such as an optical disk, for example) are recorded in a recording medium together with encrypted content data. In the recording and/or reproducing apparatus according to the present invention capable of decrypting a security key stored in a security region, reproduction or moving by the move key (Move-Key) is enabled. In the reproducing apparatus which is the conventional general-purpose machine, reproduction by the medium key (MB-Key) is assured. In this manner, a moving process by a dedicated machine is enabled while the spread of content data is prevented. In addition, reproduction of content data by the conventional machine is enabled.

What is claimed is:

1. A recording apparatus including a driver and an encoder, comprising:
an encrypting section which performs the following:
generating a first key by means of a first random number generator;
encrypting contents into first encrypted contents using the first key;
processing a key specific to the encoder using medium key block information read from a first recording medium, processing the processed key using medium specific information read from the first recording medium, thereby generating a second key;
encrypting the first key using the second key, thereby generating a medium key;
generating a third key by means of a second random number generator;
multiply-encrypting the medium key using the third key, thereby generating a move key;
processing a key specific to the driver using the medium key block information, thereby generating a fourth key; and
encrypting the third key using the fourth key; and
a processing section which performs the following when recording the contents onto the first recording medium:
recording, onto the first recording medium, first encrypted contents, the medium key, and the move key, which are supplied from the encrypting section; and
recording the third key encrypted using the fourth key onto a security area on the first recording medium,
wherein the processing section performs the following when moving the contents from the first recording medium to a second recording medium:
obtaining the second key generated in the encrypting system;
obtaining the first key by decoding the medium key using the second key;
obtaining the contents by decoding the first encrypted contents using the first key,
generating a new first key by means of the first random number generator;
encrypting the contents into new encrypted contents using the new first key;
processing the key specific to the encoder using new medium key block information read from the second recording medium, and processing the processed key specific to the encoder using new medium specific information read from the second recording medium, thereby generating a new second key;
generating a new third key by means of the second random number generator;
multiply-encrypting the new first key using the new second key and the new third key, thereby generating a new move key;
processing the key specific to the driver using the new key specific block information, thereby generating a new fourth key;

recording, onto the second recording medium, the new move key and new encrypted contents: and recording, onto a security area on the second recording medium, the new third key encrypted using the new fourth key; and erasing the move key from the first medium;

wherein when the contents are moved from the second recording medium to a third recording medium, the processing section performs the following:

decoding the new move key using the new second key and the new third key, thereby obtaining the first key;

generating a renewed first key;

decoding the new encrypted contents using the new first key to obtain the contents, and encrypting the contents using the renewed first key, thereby obtaining renewed contents;

processing the key specific to the encoder, using renewed medium key block information read from the third recording medium, and processing the processed key using renewed specific information read from the third recording medium, thereby obtaining a renewed second key;

multiply-encrypting the renewed first key using the renewed second key and the renewed third key, thereby producing a renewed move key;

processing the key specific to the driver, using the renewed medium key block information, thereby producing a renewed fourth key;

recording, onto the third recording medium, renewed encrypted contents and the renewed move key;

recording, onto a security area on the third recording medium, the renewed third key encrypted using the renewed fourth key; and erasing the new move key from the second recording medium.

* * * * *